United States Patent
Beebout

[15] 3,680,296
[45] Aug. 1, 1972

[54] HAY BALING MACHINE
[72] Inventor: Howard E. Beebout, Route 1, Columbia, Iowa 50057
[22] Filed: Sept. 18, 1970
[21] Appl. No.: 73,475

[52] U.S. Cl. ..........................56/16.4, 56/1, 56/15.9, 56/341
[51] Int. Cl. ...............................................A01d 75/00
[58] Field of Search.........56/6, 15.9, 16.1, 16.4, 341, 56/504, 505

[56] References Cited
UNITED STATES PATENTS
3,110,145  12/1963  Avery .........................56/16.4 X

*Primary Examiner*—Louis G. Mancene
*Assistant Examiner*—J. A. Oliff
*Attorney*—Zarley, McKee & Thomte

[57] ABSTRACT

A machine for forming round bales of hay including a frame detachably connected to a three point hitch on a tractor and rearwardly extending arms are pivoted between an operational lower position to a raised upper position by a hydraulic cylinder such that a continuous flexible pickup chain extending over triangularly disposed rollers carried on the side members will be moved out of contact with the formed bale of hay when the side members are pivoted to the raised position. The continuous pickup member operates continuously in both the raised and lowered positions.

8 Claims, 3 Drawing Figures

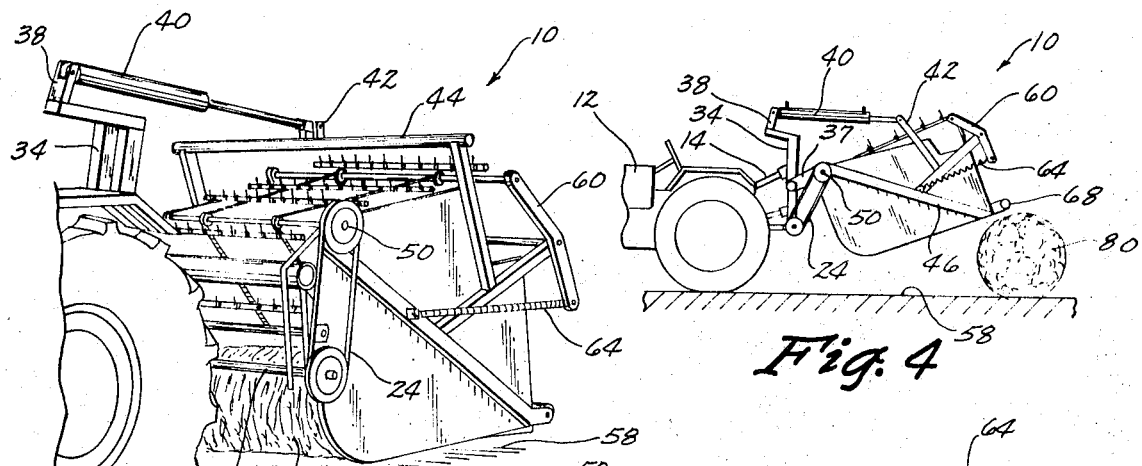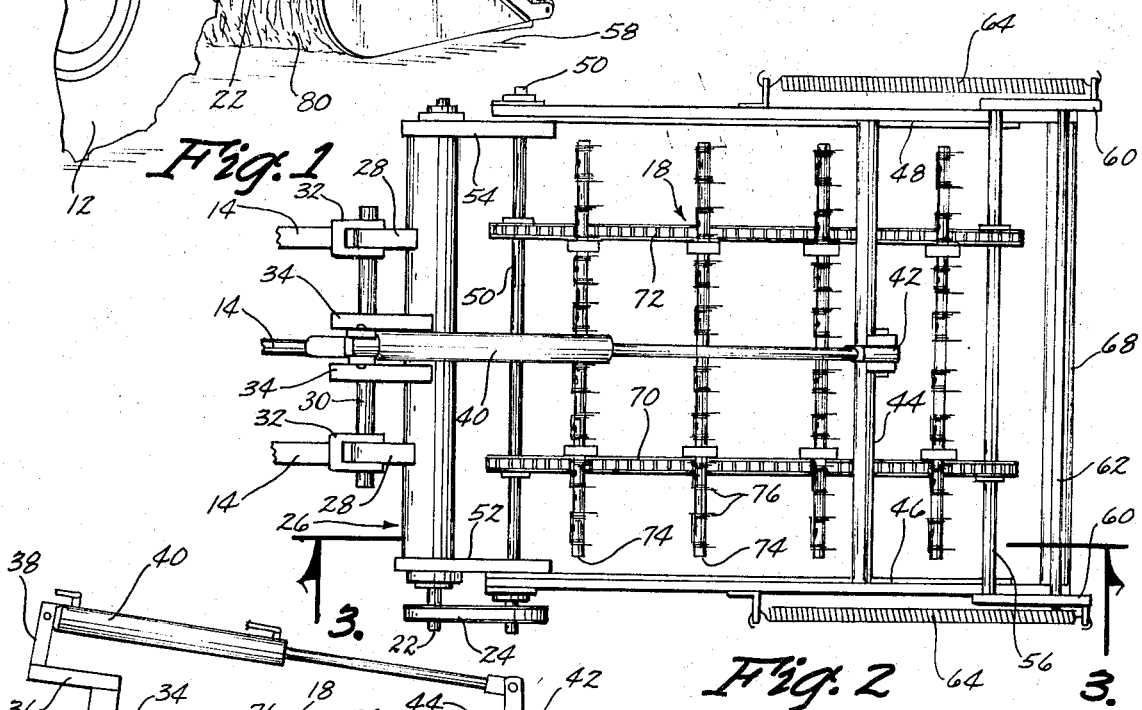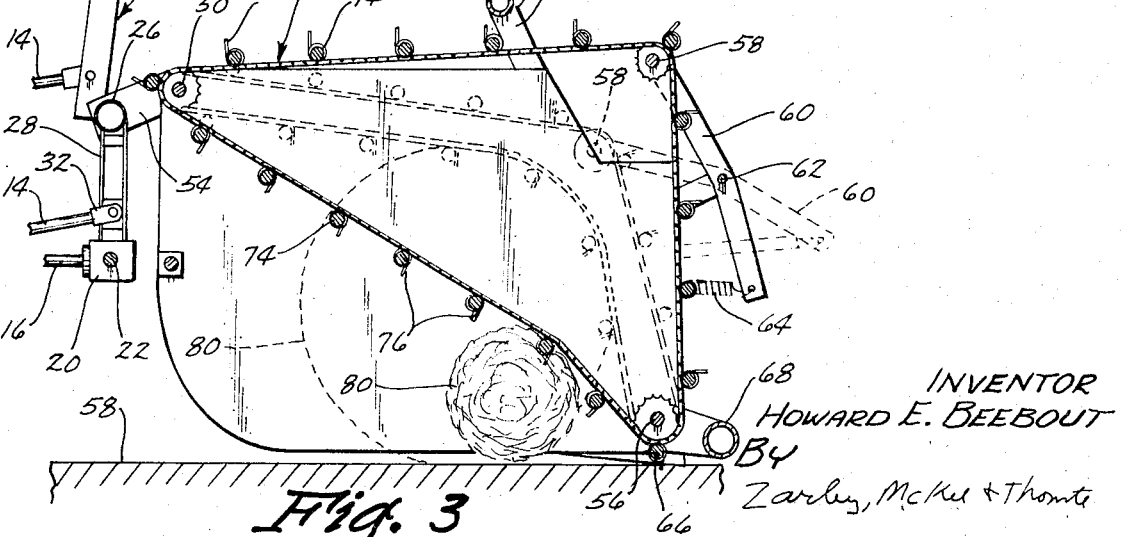

HAY BALING MACHINE

The hay baling machines heretofore available for forming round bales have been objectionably complicated and expensive.

The hay baling machine of this invention may be readily carried on the three point hitch of a tractor and operated by the power take-off of the tractor. A single hydraulic cylinder will raise and lower the machine to eject a formed bale and a continuous flexible pickup member may be operated continuously at all times whether the machine is in the operational lower position or in the raised position when ejecting a bale of hay. The machine involves no doors or latches or clutches for example and thus provides a round hay baling machine simple in design and low in cost.

The frame is carried on the three point hitch and includes rearwardly and downwardly extending oppositely disposed side members on which are carried first and second rollers adjacent the pivotal axis of the side members and the ground respectively. These rollers are stationary relative to each other and pivot up and down with the side members in response to the operation of the hydraulic cylinder anchored to the frame and connected to a cross member interconnecting the side members. A third roller is spring biased on an arm for movement towards and away from the plane of the first and second rollers such that as the bale of hay is formed between the first and second rollers and the flexible pickup member is deflected out of the plane the third roller which maintains the pickup member taut about the rollers is moved toward the plane of the first and second rollers to compensate for the size of the bale of hay being formed.

The continuous pickup member being operated continuously in the lowered to raised positions does not drag on the bale of hay when the machine is pivoted upwardly. If desired the machine may be dropped back down over a bale of hay to continue the rolling of the bale. A pair of oppositely disposed skid members are provided for engagement with the ground on each of the oppositely disposed side members.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a fragmentary perspective view of the hay baling machine of this invention in operation;

FIG. 2 is a fragmentary top plan view thereof;

FIG. 3 is a cross-sectional view taken along line 3—3 in FIG. 2; and

FIG. 4 is a reduced in scale fragmentary side elevation view of the hay baling machine in a raised position.

The hay baling machine of this invention is referred to generally in FIG. 1 by the reference numeral 10, and is carried on a tractor 12 having a three point hitch 14, a power take-off drive shaft 16 for driving the pickup conveyor 18 through a gear box 20, a transversely extending shaft 22 and a belt drive 24.

The hay baling machine 10 includes a main cross frame member 26 having oppositely disposed downwardly extending hitch members 28 interconnected by a transversely extending shaft 30 to the clevis portions 32 on the lower members of the three point hitch 14. An upstanding standard 34 includes spaced apart portions extending on opposite sides of the upper member of the three point hitch 14. A forwardly extending portion 36 is provided on the top end of the upright standard 34 and includes a further upstanding portion 38 from which a double acting hydraulic cylinder 40 extends rearwardly for connection with a post 42 on a transversely extending cross member 44 towards the rear of the baling machine 10. The cross member 44 stands rigidly between a pair of rearwardly extending side members 46 and 48 pivotally connected about an axis extending through the forward and upper roller shaft 50 which in turn extends through the outer free ends of rearwardly and upwardly extending outwardly oppositely disposed frame portions 52 and 54.

The side members 46 and 48 form oppositely disposed side walls having a roller shaft 56 at the rear adjacent the ground 58 over which the pickup hay rolling member 18 extends. A third roller shaft 58 is provided upwardly and outwardly of the plane of the rollers on the shafts 50 and 56 and is carried on an arm 60 pivoted about an axis 62 and biased outwardly as seen in FIG. 3 by a pair of oppositely disposed springs 64.

A ground engaging runner 66 is provided on each side of the machine along the lower edge of the side walls and a depth control cross member 68 extends laterally between the side walls at the rear end of the machine 10.

The power take-off powered continuous flexible hay rolling pickup 18 includes drive chains 70 and 72 on opposite sides extending around the roller shafts 50, 56 and 58. A plurality of cross members 74 are conveniently secured to the drive chains 70 and 72 and include spring teeth 76 spaced along their length.

In operation it is seen that the hay baling machine for forming round bales 80, as seen in FIG. 4, is carried entirely on the three point hitch 14 of the tractor 12 although the rear end of the machine necessarily glides over the ground on the runners 66 and is prevented from digging into the ground by a cross depth control member 68. The height of the machine over the ground can be effectively controlled by operation of the three point hitch. The angle of the machine relative to the hitch can be determined by operation of the double acting power cylinder 40 and thus the machine may be in ground engagement as seen in FIGS. 1 and 3 or in its raised position of FIG. 4 through operation of the power cylinder 40. The pickup chain 18 is continuously operated through the power take-off shaft 16 in both the raised and lowered positions of FIG. 4 and FIG. 3 respectively.

As the bale 80 is being formed the portion of the chain extending between the rollers on the shafts 50 and 56 deflects upwardly and rearwardly as seen in FIG. 3 and to compensate for this the roller on the chain shaft 58 moves forwardly and downwardly toward the plane between the shafts 50 and 56. This is permitted by the springs 64 tending to bias the roller on the shaft 58 away from the bale of hay thus keeping the conveyor pickup chain 18 taut The dash line positions shown in FIG. 3 illustrate the respective positions of the pickup chain when the bale 80 has been substantially formed compared to the solid line representation indicating its size early in the formation. Upon the bale of hay reaching the desired size in diameter, the operator of the tractor 12 merely operates the hydraulic cylinder 40 to raise the hay baling machine by pivoting it upwardly about an axis through the front and upper roller shaft 50 as seen in FIG. 4. In this raised position the pickup chain 18 continues at the same speed and passes over the formed bale of hay 80 whereupon the machine is immediately dropped to the ground again through operation of the hydraulic cylinder 40 whereupon a new bale of hay is formed. The procedure is continued over again for each bale of hay. It is appreciated that the hay may be in windrow form or loose on the ground and be picked up by the hay baling machine of this invention. If necessary, the hay baling machine may be returned to re-engage a bale of hay on the ground and the rolling process of the bale of hay may be continued by moving the tractor forward. It is thus seen that there are a minimum number of component parts involved in the hay baling machine of this invention and the speed of the conveying chain 18 does not have to be varied or stopped at any time which greatly simplifies the operation since the machine is lifted up and over the bale of hay after it has been completely formed. It has been found that best results are obtained when the speed of the pickup chain is 90 percent of the forward speed of the hay baling machine since a tighter bale is formed and it tends to force the bale to the rear of the machine preventing it from being kicked out the front end of the baling machine.

It is also understood that an automatic timing device could be incorporated into the hydraulic circuitry operating the lifting cylinder 40 to make it periodically operate thereby forming bales and releasing them at predetermined intervals of time which may be selectively varied according to the density of the hay. Additionally, the pickup member, if desired, may be stopped after the formation of each bale although this is not necessary as the machine is lifted over the bale as it is being discharged.

I claim:

1. A tractor having a three-point hitch and hay baling machine for forming round bales comprising, said baling machine having a frame pivotally supported by and connected to said hitch, said frame including oppositely disposed side members, power means for operating said hitch to raise and lower said baling machine, a power cylinder connected at its forward end to said hitch and at its rear end to said baling machine frame remotely of said hitch connection to said baling machine frame for pivoting said baling machine up and down between a raised bale discharge position and a lowered bale forming position, and said baling machine including on said frame a powered continuous flexible hay rolling member extending around a plurality of spaced apart rollers extending between said side members and including a first roller spaced adjacent said hitch and above a second roller positioned adjacent the ground in said bale forming position when hay is being rolled into a bale, and a third roller disposed between and out of the plane of said first and second rollers, said third roller carried on an arm being spring biased to maintain said continuous flexible hay rolling member tight over a hay bale and bias said third roller on said arm to pivot towards the plane of said first and second rollers as said round bale is being formed, said first and second rollers always being stationary relative to each other.

2. The structure of claim 1 wherein said powered continuous flexible hay rolling member is continuously operated during pivotal movement between said bale forming position and said bale discharge position.

3. The structure of claim 2 wherein said hitch and frame include an upstanding post to which said forward end of said power cylinder is secured and said power cylinder extends rearwardly over said continuous flexible member.

4. The structure of claim 2 wherein the powered continuous flexible hay rolling member is adapted to be powered by the power take-off on the prime mover and the speed of said continuous member is directly related to the forward speed of said prime mover.

5. The structure of claim 1 wherein said third roller is located relative to said first and second rollers such that as said bale of hay being formed becomes larger said continuous flexible member between said first and said second rollers is deflected towards said third roller which is being simultaneously moved towards the plane of said first and said second rollers to compensate for the size of the bale of hay.

6. The structure of claim 5 wherein said first, second and third rollers are substantially arranged in triangular relationship before and during the formation of a bale of hay.

7. The structure of claim 9 wherein said oppositely disposed side members include runners for engagement with the ground.

8. The structure of claim 1 wherein the axis of pivotal movement of said side members is coincident to the axis of rotation of said first roller.

* * * * *